United States Patent
Zhou et al.

(10) Patent No.: US 10,474,748 B2
(45) Date of Patent: Nov. 12, 2019

(54) CONTEXTUAL NATURAL LANGUAGE INPUT PROCESSING IN ENTERPRISE APPLICATIONS BASED ON STATIC AND DYNAMIC APPLICATION PARAMETERS

(71) Applicant: SAP SE, Walldorf (DE)

(72) Inventors: Xiwei Zhou, Mountain View, CA (US); Karthik Uppuluri, Palo Alto, CA (US); Till Pieper, Menlo Park, CA (US)

(73) Assignee: SAP SE, Walldorf (DE)

( * ) Notice: Subject to any disclaimer, the term of this patent is extended or adjusted under 35 U.S.C. 154(b) by 172 days.

(21) Appl. No.: 15/350,730

(22) Filed: Nov. 14, 2016

(65) Prior Publication Data

US 2018/0137094 A1 May 17, 2018

(51) Int. Cl.
*G06F 9/48* (2006.01)
*G06F 17/27* (2006.01)
*G06F 17/28* (2006.01)
*G06F 16/242* (2019.01)

(52) U.S. Cl.
CPC ........ *G06F 17/2705* (2013.01); *G06F 9/4881* (2013.01); *G06F 16/243* (2019.01); *G06F 17/2765* (2013.01); *G06F 17/2827* (2013.01)

(58) Field of Classification Search
CPC .............. G06F 17/2705; G06F 9/4881; G06F 17/2827; G06F 16/243; G06F 17/2765
See application file for complete search history.

(56) References Cited

U.S. PATENT DOCUMENTS

| | | | |
|---|---|---|---|
| 5,404,295 A * | 4/1995 | Katz | G06F 17/241 704/9 |
| 10,318,625 B2 * | 6/2019 | Guggilla | G06F 17/246 |
| 2010/0312549 A1 * | 12/2010 | Akuwudike | G06F 17/276 704/9 |
| 2014/0337371 A1 * | 11/2014 | Li | G06F 17/30958 707/767 |

(Continued)

OTHER PUBLICATIONS

Gala, Shyam. "Translating English to SQL." Created Dec. 8, 2005. (Year: 2005).*

(Continued)

*Primary Examiner* — Meng Ai T An
*Assistant Examiner* — Michael W Ayers
(74) *Attorney, Agent, or Firm* — Mintz Levin Cohn Ferris Glovsky and Popeo, P.C.

(57) ABSTRACT

A system, a method, and a computer program product for contextual natural language processing in software applications are disclosed. At least one input instruction for a software application is converted, using a natural language processing, to a predetermined format associated with the software application. The converted input instruction is filtered based on at least one parameter associated with the software application. The filtered input instruction is compared to a plurality of transactions associated with the software application. Based on the comparison, at least one transaction in the plurality of transactions capable of being executed by the software application is selected in response to the filtered input instruction. The software application executes the selected transaction based on the filtered input instruction.

18 Claims, 7 Drawing Sheets

(56) References Cited

U.S. PATENT DOCUMENTS

| | | | |
|---|---|---|---|
| 2015/0169582 A1* | 6/2015 | Jain | G06F 17/3053 |
| | | | 707/748 |
| 2017/0116260 A1* | 4/2017 | Chattopadhyay | ............................ |
| | | | G06F 17/30401 |
| 2017/0177715 A1* | 6/2017 | Chang | G06F 17/30705 |
| 2018/0052842 A1* | 2/2018 | Hewavitharana | ... G06F 17/3043 |

OTHER PUBLICATIONS

Singh, Garima et al. "An Algorithm to Transform Natural Language into SQL Queues for Relational Databases", (Year: 2016).*
Cook, Sam. "How to use Google's search tools to get better results". (Jun. 29, 2012). Accessible at https://www.geek.com/geek-pick/how-to-use-google-search-tools-1498887/. Accessed on Mar. 28, 2019. (Year: 2012).*

* cited by examiner

CONTEXTUAL NATURAL LANGUAGE INPUT PROCESSING IN ENTERPRISE APPLICATIONS BASED ON STATIC AND DYNAMIC APPLICATION PARAMETERS

TECHNICAL FIELD

This disclosure relates generally to data processing and, in particular, to using contextual natural language in software applications.

BACKGROUND

Today, many companies and individuals rely on effective operation of software applications in conducting their daily activities. The software applications include internet browsing applications, financial software applications, sales applications, and/or many other types of applications. Software is typically used by individuals to perform a variety of tasks. Such tasks can include compilation and/or presentation of various information, data, etc., execution of functionalities of software applications, performing various transactions, etc.

Typically, users of software applications provide instructions to the software applications via user interfaces. The instructions can be in the form of a text typed using a computing device's keyboard, a mouse click, etc. Some software applications may require the users to know the specific formats and/or inner-workings of the software applications in order to obtain a result that is desired by the user. This can involve substantial training of users to familiarize them with proper ways of providing instructions to software applications, such as by using a particular language, writing queries in a specific format, etc. Such training can consume significant amount of time, money, and/or other resources, leading to reduced productivity, reduced effectiveness and/or efficiency of software applications, etc. Thus, there is a need for a way to provide instructions to software applications using a natural language of the user.

SUMMARY

In some implementations, the current subject matter relates to a computer implemented method for contextual natural language in software applications. The method can include converting, using a natural language processing, at least one input instruction for a software application to a predetermined format associated with the software application; filtering, using the natural language processing, the converted input instruction based on at least one parameter associated with the software application; comparing the filtered input instruction to a plurality of transactions associated with the software application; selecting, based on the comparing, at least one transaction in the plurality of transactions capable of being executed by the software application in response to the filtered input instruction; and executing, by the software application, the selected transaction based on the filtered input instruction. At least one of the converting, the classifying, the comparing, the selecting, and the executing can be performed on at least one processor of at least one computing system.

In some implementations, the current subject matter can include one or more of the following optional features. The input instruction can include at least one of the following: an audio, a video, a text, a graphic, and any combination thereof. The parameter(s) can include at least one of the following: at least one static parameter and at least one dynamic parameter. The converted input instruction can be filtered using the static parameter to determine at least one token. The token can identify at least one portion of the converted input instruction and can be used to select the transaction from the plurality of transactions. The dynamic parameter can identify at least one additional transaction in the plurality of transactions associated with selected transaction (e.g., looking into additional data, triggers, etc.).

In some implementations, the execution of the transaction can include generating at least one view on at least one user interface to present an output of the executed selected transaction. The output can include at least one of the following: an audio, a video, a text, a graphic, and any combination thereof.

In some implementations, the method can also include providing, based on the executed selected transaction, at least another input instruction, and selecting, based on another input instruction, at least another transaction in the plurality of transactions and executing that transaction.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide use of contextual natural language processing in software applications.

In some implementations, the current subject matter can receive at least one input instruction (e.g., audio, video, text, graphic, etc.) and convert it using a natural language processing. The natural language processing functionality can be used to filter the converted input instruction based on at least one parameter associated with a software application for which input instruction may be intended. The filtered input instruction can be compared to one or more transactions associated with the software application to determine if there is a match between the filtered instruction and the data and/or functions of the software application. Based on the match, the transaction can be selected for execution. The output of the executed transaction (e.g., data, functions, etc. (e.g., a view containing a table, a trade, saving of a particular scenario, etc.)) can be presented to a user using the software application in a user interface of user's computing device.

Enterprise applications typically rely on various processes, workflows, data, etc. for performing various functions. To effectively use such applications, end users may need to be trained so that they can be familiar with environment(s) and/or functionalities of the applications. Periodically, enterprise applications (e.g., finance, supply chain, procurement, etc.) may include domain-specific business logics and/or content, which the end user may need to be familiar with. This may require end user's knowledge of applications' transaction code in order to execute transactions, run reports, perform workflow transactions, analyze performance of processes, etc. This may prevent end users from being able to immediately use the applications, as training time and additional costs may be required. In some implementations, the current subject matter can provide an end user with an ability to use natural language processing ("NLP") to provide audio, video, text, written, etc. instructions and/or any other combination thereof to the applications without having to undergo special training. The current subject matter can include a natural language processing engine, which can accept user's instructions (e.g., spoken or otherwise), analyze the instructions, translate analyzed instructions into appropriate commands for various components of the user's system (or other systems) to perform (e.g., retrieve data, execute a sales order, transfer assets, provide communications to the user, etc.).

For example, in a supply chain management ("SCM") system, a user may need to provide customer names and/or categories, product names and/or time frames, etc. for the purposes of analysis of certain customers/customer groups and/or their product purchases in a particular time period. The desired output can include frequency, dates, values, etc. of customer purchases, whereas the input can include a customer name, time period, product category, etc. the current subject matter system can use an NLP engine to receive user's input and provide an appropriate report. An existing system typically will generate a report by taking the above input parameters and running a query against a database to obtain results for the user. This will require the user to properly enter input parameters and/or write a particular query.

Additionally, most of the users using existing applications can only navigate using point-and-click interactions in order to navigate from one function to another in sequence (e.g., from A to B, to C). Such users may be lacking ability and/or might know how to navigate from one function to another by skipping intermediate functions (e.g., from A to Z in one step). In contrast, the current subject matter's NLP engine can enable a faster navigation through the user's system(s), function(s), data, etc. For example, using the current subject matter's system, a user can simply state (e.g., speaking, typing, displaying, etc.): "Please show me how many times and for how much Bear INC purchased from us in product category Gera". The current subject matter's NLP engine can accept this input, parse it into specific terms, and translate it into specific procedures and/or SQL queries to obtain the requested data.

Some of the advantages of the current subject matter's system can include the following. The current subject matter's NLP engine can enable a quicker navigation between functions, as it can provide a one-step shortcut to get from one function to another (and/or node, and/or data point, etc.), which can be independent of whether they relate to one another or not. Execution of one natural language query can accomplish the desired result. The current subject matter's NLP engine can tolerate various degrees of fuzziness (e.g., different ways of providing instructions, various accents of users, different languages used to provide instructions, etc.). The current subject matter's NLP engine can allow even untrained users to access any function, even if the users do not know the exact terms and/or know only parts of them. Further, in some implementations, the current subject matter's NLP engine can enable an unlimited access to any available function(s) and/or data that existing user interface-based applications might not be able to provide.

Additionally, the current subject matter's NLP engine can enable users to perform various complex transactions without requiring users to memorize complex transaction code or expecting the users to go through complex forms to enter complex content into a system. The current subject matter's NLP engine can enable a much easier way for users to communicate with systems using natural language (and/or text, graphics, video, audio, etc.) in various contexts. The current subject matter can enable users to accomplish various user-centric tasks (e.g., approval of vacation requests for next month from a sales department, reject all purchase approval requests with a value larger than 50,000 Euros, create a purchase request for 14 wireless telephones from a pre-approved vendor, etc.).

In some implementations, the current subject matter's NLP engine can enable user to provide input to the system (e.g., audio, video, graphics, text, etc.) and trigger one or more transactions that may be related and/or associated with the input without the user providing specific instructions to perform such transactions. This can avoid memorization by users of complex transaction code and otherwise requiring users to navigate through extensive navigation menus to get to the required function. The current subject matter system can enable users to perform one or more activities without knowing and/or providing specific terms for it.

In some implementations, the current subject matter's NLP's engine can enable a bi-directional communication with the user. When users process various transactions, related context of application(s) can be known to the NLP-integrated applications and, thus, the system can interact with the user using a dialog mode to generate the required output. This can be accomplished in a much shorter end-to-end time. For example, the user can provide an initial customer information to the system and the system can provide customer's last purchase order using the system, customer's total purchases in a certain time frame, customer's historic credit information, and/or any other data. The data can be provided as a result of the user's input and/or after certain interactions with the user.

In some implementations, the current subject matter's NLP engine can provide an ability for the user to provide information to the system (e.g., key performance indicators ("KPI"), etc.) and based on the provided information solve various challenges. The system can analyze provided information and generate an output for the user, e.g., a presentation that a senior executive can provide to members of a board of directors and/or shareholders of a company.

The current subject matter system can be advantageous to executives that have a deep knowledge of various business challenges but a lower understanding of the operation of the software applications that may be needed for analysis of information, creation of presentations, etc. The current subject matter system can enable such an executive to generate a presentation and provide it from the executive's personal device (e.g., a personal computer, a laptop, a cellular telephone, a smartphone, a tablet computer, a smart watch, etc.). For example, a company executive, using the current subject matter system, provide an input to the system and then can go through the key performance of different regions, identify critical P&L performance issues, and/or change business drivers to simulate a mitigation plan. The executive can provide the following commands (e.g., audio, video, text, graphics, etc.) to the executive's device (which are then provided to the system):

"Simulation"—jump to the global operational performance;
"Go to Japan"—look at the overall performance, decide to look into more detail on Japan;
"Change to Quarter 3"—look into future predictions from the systems;
"Enable Volume"—analyze the value driver tree of the performance, identify volume changes, try to enable drivers to perform the simulation;
"Increase Volume by 5%"—increase volume by 5%, check the impact to the operational margin;
"Show the trend"—look at the trend across multiple quarters;
"Save"—save the simulation;
"Back to overview"—back to the simulation/overview.

In some implementations, the executive can have a full control of the application without having to learn how to operate the application. The executive can use one or more authorized personal devices for application controls without compromising security of an environment and by avoiding a complex hardware setup that may be needed otherwise. This can be especially useful when enterprise software applications are used. Such applications are typically domain specific, have structured underlying information and business context, but do not require an entirely unconstrained scope of natural language. This can allow executive to provide free-form instructions or commands to the system (e.g., audio, video, graphics, text, etc.) and generate desired results. In some exemplary implementations, the current subject matter system can rely on KPIs: operating profit, margin, volume, exchange, etc., region/country focus, business driver, product/service, etc. and/or any combination thereof in order to perform analysis for the users.

Figure 1:
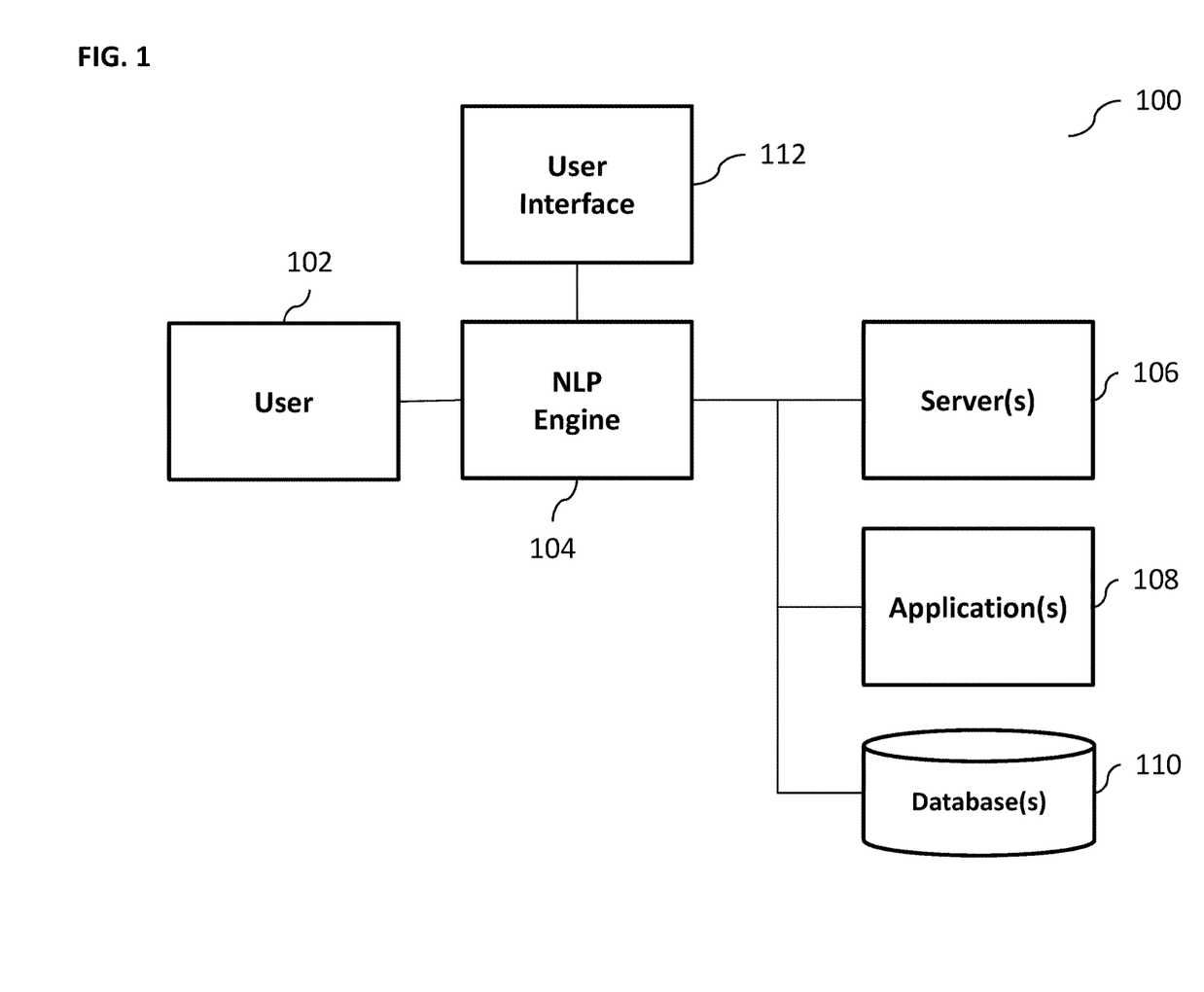
FIG. 1 illustrates an exemplary natural language system, according to some implementations of the current subject matter.

FIG. 1 illustrates an exemplary natural language system 100, according to some implementations of the current subject matter. System 100 can include a natural language processing ("NLP") engine 104, one or more servers 106, one or more applications 108, and/or one or more databases 110. The NLP engine 104 can be communicatively coupled to the server(s) 106, the application(s) 108, and/or the database(s) 110 using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The NLP engine 104 can include any combination of hardware and/or software. In some implementations, the NLP engine 104 can be disposed on one or more computing devices, such as, a personal computer, a laptop, a cellular telephone, a smartphone, a tablet computer, and/or any other computing device and/or any combination thereof. In some implementations, the computing device can be user's 102 computing device, where at least a portion of the NLP engine 104 can be disposed on the user's 102 computing device. In alternate implementations, the NLP engine 104 can be disposed on one or more computing devices that are not a device that is being used by the user to access the NLP engine 104. The user 102 can access the NLP engine 104 via a network, such as a network described above.

The user 102 can access the NLP engine 104 and provide various instructions and/or commands. The instructions/commands can be in a form of a natural language and/or in any other form. The instructions/commands can include at least one of the following: audio, video, text, graphics, images, etc. and/or any combination thereof. In some implementations, the instructions can be provided using a microphone (either a separate microphone or a microphone imbedded in the user's computing device), a speaker, a screen (e.g., using a touchscreen, a stylus pen, and/or in any other fashion), a keyboard, a mouse, a camera, a camcorder, and/or any other device. The NLP engine 104 can be communicatively coupled to a user interface 112 (which can be part of the user's computing device and/or a separate), which can also be used for the purposes of entering instructions/commands to the NLP engine 104. The user interface 112 can also display results/output of the NLP engine 104's activities (e.g., present data responsive to the user's request).

Once the instructions/commands have been submitted to the NLP engine 104, the NLP engine 104 can process and analyze the instructions to determine substance/scope of the tasks that the NLP engine 104 may need to perform. In some implementations, the NLP engine 104 can use voice recognition, character recognition, and/or any other methods for processing user's instructions/commands and determining what the user 102 would like the NLP engine to do. The NLP engine 104 can also be trained in recognizing multiple users' languages, voices, handwriting styles, imagery, etc. The NLP engine 104 can also interact with the user 102 to clarify, confirm, etc. user's instructions/commands, if necessary. The interactions can be via audio, video, graphics, text, etc. The user interface 112 and/or any other devices can be used to interact with the user 102. Additionally, the NLP engine 104 can also authenticate the user 102. The authentication can be performed via a logon (e.g., user name and password), a biometric authentication (e.g., a retinal scan, a fingerprint scan, etc.), a voice recognition authentication, and/or via any other way and/or any combination of ways.

After performing recognition of the user instructions/commands, the NLP engine 104 can parse the recognized instructions/commands to extract various keywords and/or triggers to determine what action the NLP engine needs to perform. For example, the NLP engine 104, based on the parsed instructions/commands from the user, can generate a query (e.g., an SQL query) and transmit the query to the database(s) 110. Then, a search of the database(s) 110 can be performed to extract and/or assemble appropriate data for transmission back to the NLP engine 104. The NLP engine 104 can receive the data and provide it to the user 102, for example, via the user interface 112 (which can be a computer monitor, a projector, a holographic presentation, a print-out, etc.). The received data can be compiled by the NLP engine 104 for presentation to the user 102 in a desired format. In some implementations, the user 102 can instruct/command the NLP engine 104 to compile/format the data in a specific format (e.g., the user 102 may wish to create a presentation for display on a projector screen, etc.).

In some implementations, the user 102 can instruct/command the NLP engine 104 to initiate execution of a particular software application. The NLP engine 104 can obtain the application from application(s) 108 and/or server(s) 106. The desired application can be downloaded onto the user's computing device and/or executed via a communications link. In some implementations, the server(s) 106, the application(s) 108, and/or the database(s) 110 can be communicatively coupled to one another, where one or more of the components 106-110 can call on another or more other components 106-110 to fulfill a particular instruction/command of the user 102. Based on user's instructions/commands, the NLP engine 104 can generate appropriate sequence of commands to each and/or one or more components 106-110.

Figure 2:
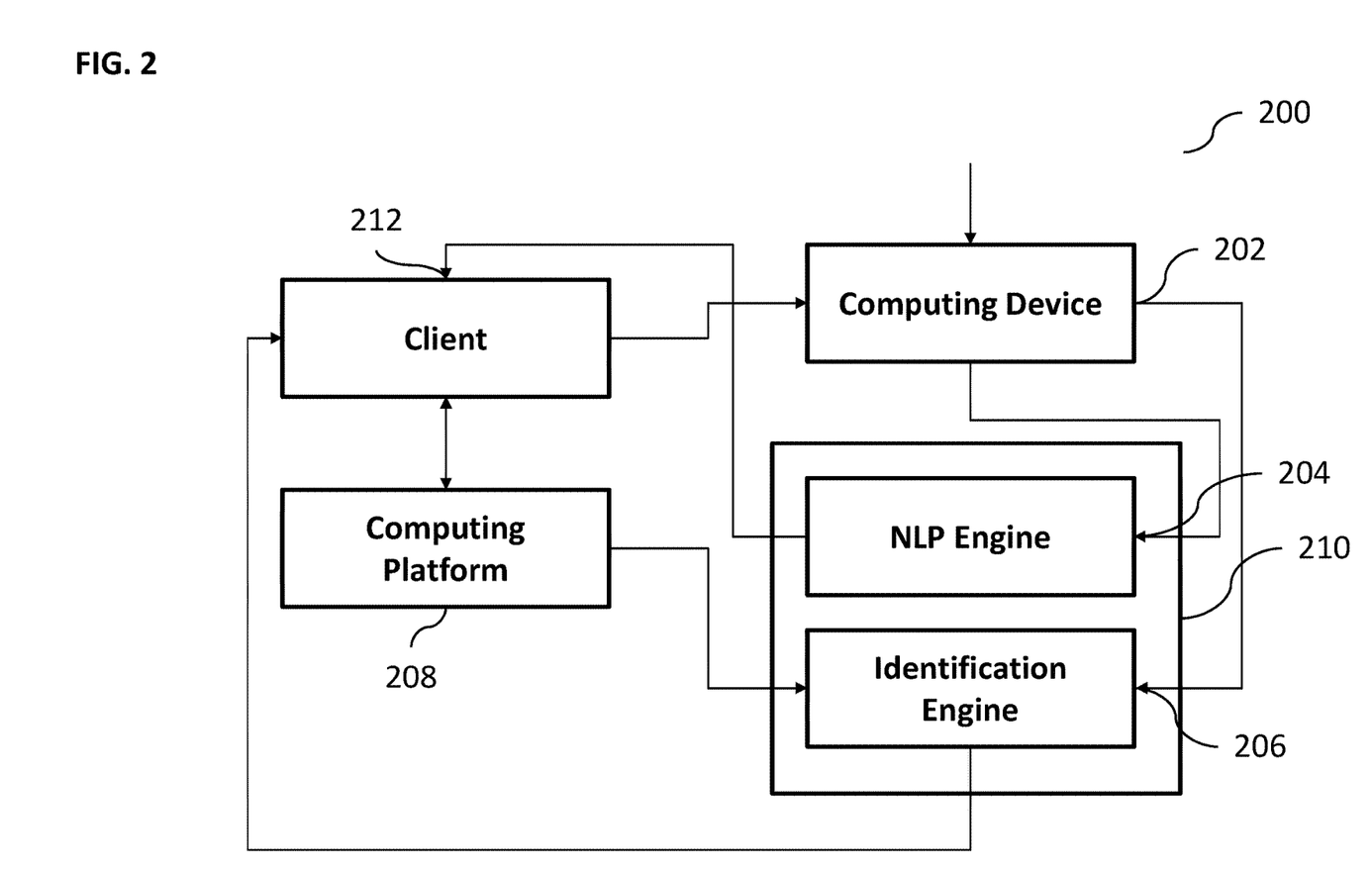
FIG. 2 illustrates an exemplary architecture for providing natural language processing capabilities, according to some implementations of the current subject matter.

FIG. 2 illustrates an exemplary architecture 200 for providing natural language processing capabilities, according to some implementations of the current subject matter. The system 200 can include a computing device 202 (which can be a user's computing device), a natural language processing ("NLP") engine 204, an identification engine 206, a computing platform 208, and a client 212 (e.g., a web client, such as a user interface that can present various outputs to the user). The NLP engine 204 and the identification engine 206 can be part of a single computing component 210. Alternatively, they can be disposed on different computing devices. All components 202-212 can be communicatively coupled to one another using at least one of the following: a wired network, a wireless network, MAN, LAN, WAN, VLAN, an internet, an extranet, an intranet, and/or any other type of network and/or any combination thereof. The computing platform 208 can be implemented on an in-memory, column-oriented, relational database management system, such as, for example, SAP HANA (as developed and available from SAP SE, Walldorf, Germany). The platform 208 can include one or more servers, one or more databases, and/or any other hardware, software, and/or any combination thereof.

To initialize system 200 for use, client 212 can be initialized using the computing platform 208. The computing platform 208 can coordinate with the identification engine 206, which, for example, can be a socket controller that can provide a socket identifier for connection of the client 212 to the NLP engine 204. Once the client 212 and the identification engine 206 are connected (e.g., using a handshake), the NLP engine 204 can be initialized (e.g., initialization of grammar, voice recognition, image recognition, etc.). The client 212 can also be paired with the computing device 202 to ensure that the user can provide instructions/commands to the system 200. The user's computing device 202 can communicate with the identification engine 206 to establish connection (e.g., request connection to the socket of the client 212). At this point, initial setup of the system 200 can be complete and the user can begin providing instructions/commands (e.g., audio, video, graphics, text, etc.) to the system 200 using computing device 202. Upon receiving user's instructions/commands, the computing device 202 can provide them to the NLP engine 204 for processing (e.g., conversion of audio to text, etc.). The processed instructions/commands can be provided to the client 212 via an established connection between the identification engine 206 and the client 212. The NLP engine 204 can then interact via the client 212 to obtain information, applications, etc. for the user.

Figure 3:
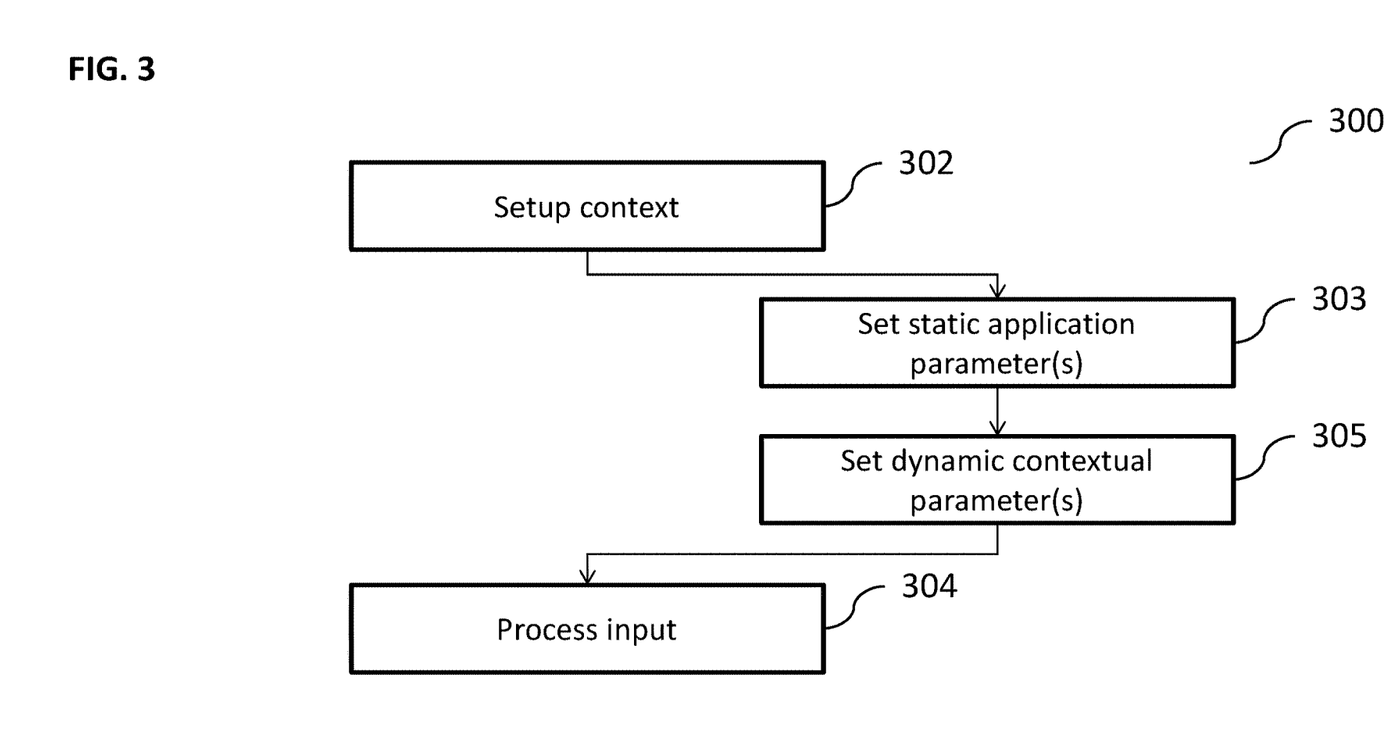
FIG. 3 illustrates an exemplary process performed by a natural language processing engine shown in FIG. 2, according to some implementations of the current subject matter.

FIG. 3 illustrates an exemplary process 300 performed by the NLP engine 204, according to some implementations of the current subject matter. At 302, the NLP engine 204 can perform set up of a context. The context setup can include setting static application parameters, at 303, and setting dynamic contextual parameters for one or more actions, at 305. Once the setup is complete, the NLP engine 204 can perform processing of user instructions/commands, at 304.

In some implementations, setting up of a context can be performed to prepare or pre-process a particular application (which may be receiving user's input) for processing the instructions/commands received from the user. The context setup can include classifying the context according to particular parameters, categories, filters, and/or in any other fashion. The context can include a set of tokens that can be used to classify a particular input received from the user (e.g., a sentence, a group of words, a word, any other text, a graphic, etc.). For example, the NLP engine 204 can include a classifier component that can return a contextName when the NLP engine 204 classifies an input provided by the user. To classify the input, a set of tokens, i.e., contextData, can be assigned to the input. The NLP engine 204 can use an addToClassifier function to add contextData to the classifier component. When the addToClassifier function returns a false value, the contextData has been not added to the classifier component. Otherwise, the contextData is added to the classifier component. For example, the following addToClassifier function can be used:

```
{
    "appName": "app",
    "contextArray": [
        {
            "contextName": "filters",
            "contextData": [
                {
                    "text": "quarter"
                },
                {
                    "text": "year"
                }
            ],
            "addToClassifier": true
        }
    ]
}
```

In the above exemplary code, the "app" can be an application name that can be used by the user for the purposes of processing the input. The above function is using filters of "quarter" and "year" for filtering or classifying the data for the purpose of adding the data to the classifier component. Thus, when the user provides an input to the application "app" that includes words like "quarter" and/or a "year, e.g., "select quarter 3", the NLP engine will classify the input as a filter, because the classifier component determined presence of the word "quarter", as indicated above. The NLP engine can receive the input and tokenize it based on the specified context in the classifier component. The NLP engine can then return the result, which can include a filter based on the input, thereby allowing a corresponding action to be taken. While the above discussion is provided with respect to a text input that can be received from the user, it can be appreciated that any type of input (e.g., text, graphics, audio, video, etc.) can be processed and appropriately classified according to various categories, filters, parameters, etc.

As shown in FIG. 3, as part of context setup, the current subject matter can also set static application semantics for the purposes of processing input from the user. In some implementations, the application (which is receiving input from the user) can have one or more views for representing different aspects of the information that is being sought by the user through user's instructions/commands, which can retrieve context value from the data model at the backend. In a non-limiting example, the following exemplary function can be used to represent margin performance, marketing share, etc. context that may be sought by the user:

```
var contexts = {
    "appName": "app",
    "contextArray": [
        {
            "contextName": "filters",
            "contextData": [
                {
                    "text": "quarter"
                },
                {
                    "text": "year"
                }
            ],
            "addToClassifier": true
        },
        {
            "contextName": "actions",
            "contextData": [
                {
                    "text": "increase",
                    "alias": "0"
                },
                {
                    "text": "increment",
                    "alias": "0"
                },
```

As shown above, with regard to the context filtered by "quarter" and/or "year", the user may wish to view data that may be associated with various static "actions" ("increase" or "increment") defined by the application. This may be useful to the user when attempting to view how a particular parameter has performed given a particular set of actions that are applied to it. In some implementations, the static parameters can be setup for any type of context (e.g., audio, video, text, graphics, etc.) so that when instructions/commands are received from the user, the NLP engine can appropriate classify the information and process it according to preset static and/or dynamic parameters.

In some implementations, the current subject matter can also allow setting dynamic contextual parameters. The setup of static and dynamic parameters can be performed simultaneously and/or one after another in any order. The dynamic parameters can be used to alert and/or advise the user of various other information that the user may need to look into as a result of the user's instructions/commands. This may be helpful when the user, upon receiving desired information in response to user's instructions/commands, is presented with one or more views that can include the desired information along with various dynamic prompts (e.g., hints, triggers, buttons, links, etc.) allowing the user to look into and/or request additional information that can be useful to the user. Upon prompts being accessed, the NLP engine can dynamically access the additional information that is being sought. Moreover, the dynamic prompts can also be used to present same requested information in a variety of contexts and/or views (e.g., a view of margin performance as changed from Korea to Japan).

In some implementations, the dynamic parameters can be preset based on the application that is being used and/or instructions/commands from the user. The following exemplary function code can be used to dynamically set context that can include a list of countries as a dynamic context:

```
abc.socket.send(JSON.stringify({
    eventName: "addContext",
    contextData: countriesContext.countries,
    contextName: "vdt",
    addToClassifier: true
}));
```

As shown above, "countriesContext.countries" can be a context that can be set dynamically. There can be no action directly associated with, and instead, the value of "countriesContext.countries" can be used to determine a scope of dynamic parameters. The current subject matter system can return an appropriate response to the user when a value associated with instruction(s) provided by user is within the scope of the dynamic parameters. Otherwise, the user can receive an undesired response, incomplete response, and/or no response at all from the system. Additionally, the dynamic context can be either set as a range of values and/or dynamically retrieved from a database and/or a backend model when the user accesses/reaches a different view of the application being used to receive input from the user.

Once the setup of the context is complete, the NLP engine can perform processing of the input instructions/commands from the user. The NLP engine can process user's instructions/commands, tokenize them, and match them to corresponding classifier(s). If a match is found, the NLP engine can trigger an action associated with the instructions/commands. Otherwise, an error message can be returned to the user that user-request action cannot be performed and/or information cannot be found. When a match is found, the function/action can be called through the socket to the application client 212 (as shown in FIG. 2) and the resulting information/action can be presented to the user (e.g., via a user interface 112 as shown in FIG. 1 and/or in any other fashion).

In some implementations, the current subject matter can allow training the NLP engine in recognition of the user's input. Additionally, the user may also learn how to adjust the user's instructions/commands so that the correction information is found, proper action is performed, etc. in response to the instructions/commands. In some implementations, the current subject matter can also provide appropriate security and/or encryption protocols that can be used to protect the instructions/commands received from the user as well as information provided to the user as a response.

Some of the advantages of the current subject matter can include at least the following. The current subject matter can allow a faster navigation to desired information/actions by skipping unnecessary navigation steps between various functions. Further, less training may be required for the users and/or the NLP engine as appropriate knowledge (e.g., business transaction knowledge) can sufficient to navigate even the most complex scenarios by using natural language. Also, the current subject matter can provide a faster time to an insight by allowing fuzziness and contextual understanding, which can get to business insights faster. Additionally, the current subject matter can provide improved user interfaces, which can include uncluttered graphical user interfaces for business applications that can cover complex business scenarios. The current subject matter can also provide more functionality to the users by allowing users access to additional business functions and making them accessible on request via natural language. The current subject matter can provide unlimited and/or easily accessible filter and/or sorting capabilities, where any field and/or any information can be used to generate a desired output without unnecessary abstractions of user interfaces. Also, use of the NLP engine can allow for automated context analysis. In some implementations, developers would not even have to change applications to enable natural language processing integration. The current subject matter can perform context recognition, context analysis (e.g., analysis of user interfaces, screen layout, available fields, values, available data at the backend, selection values, absolute and/or relative ranges, etc.) and provide the information to the applications for retrieval of appropriate data/functionalities.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
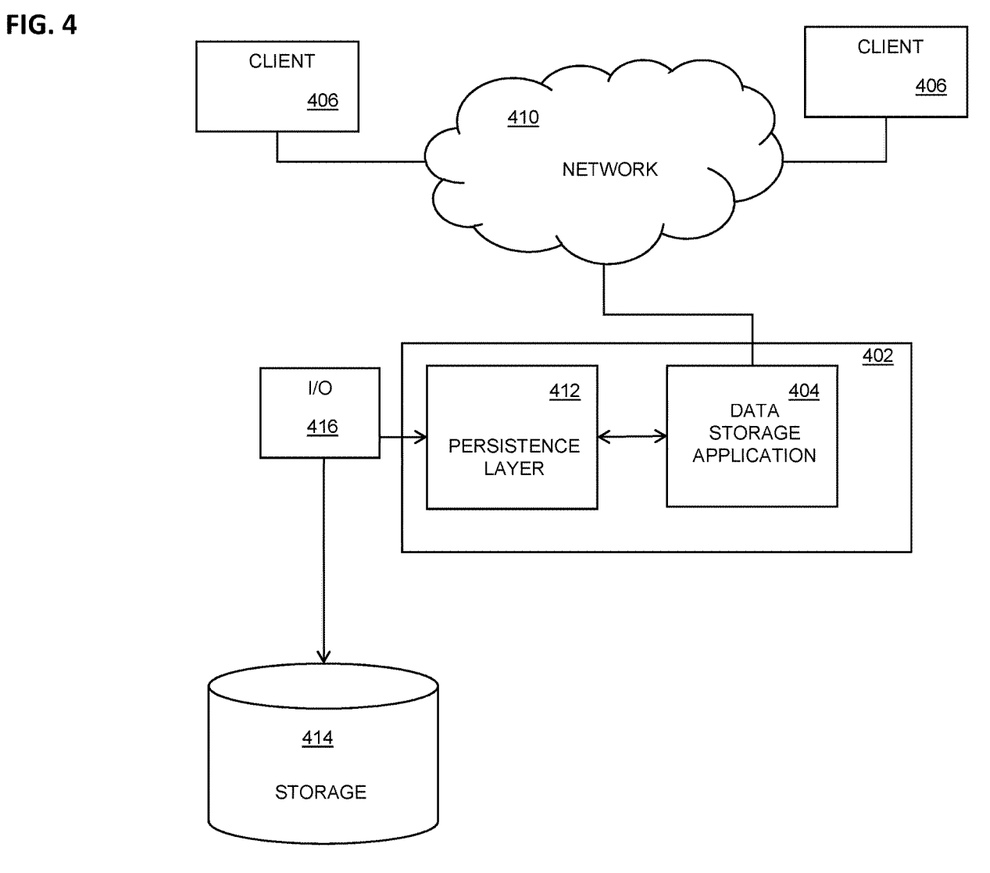
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
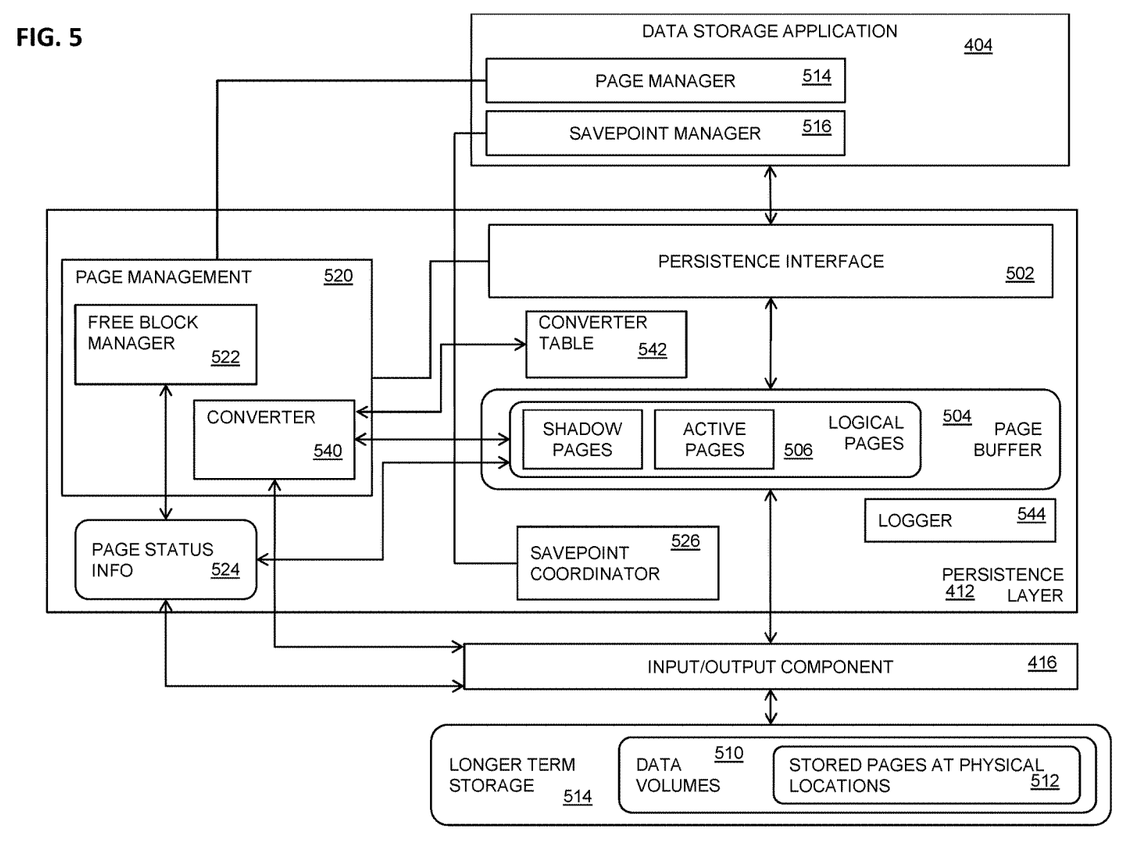
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
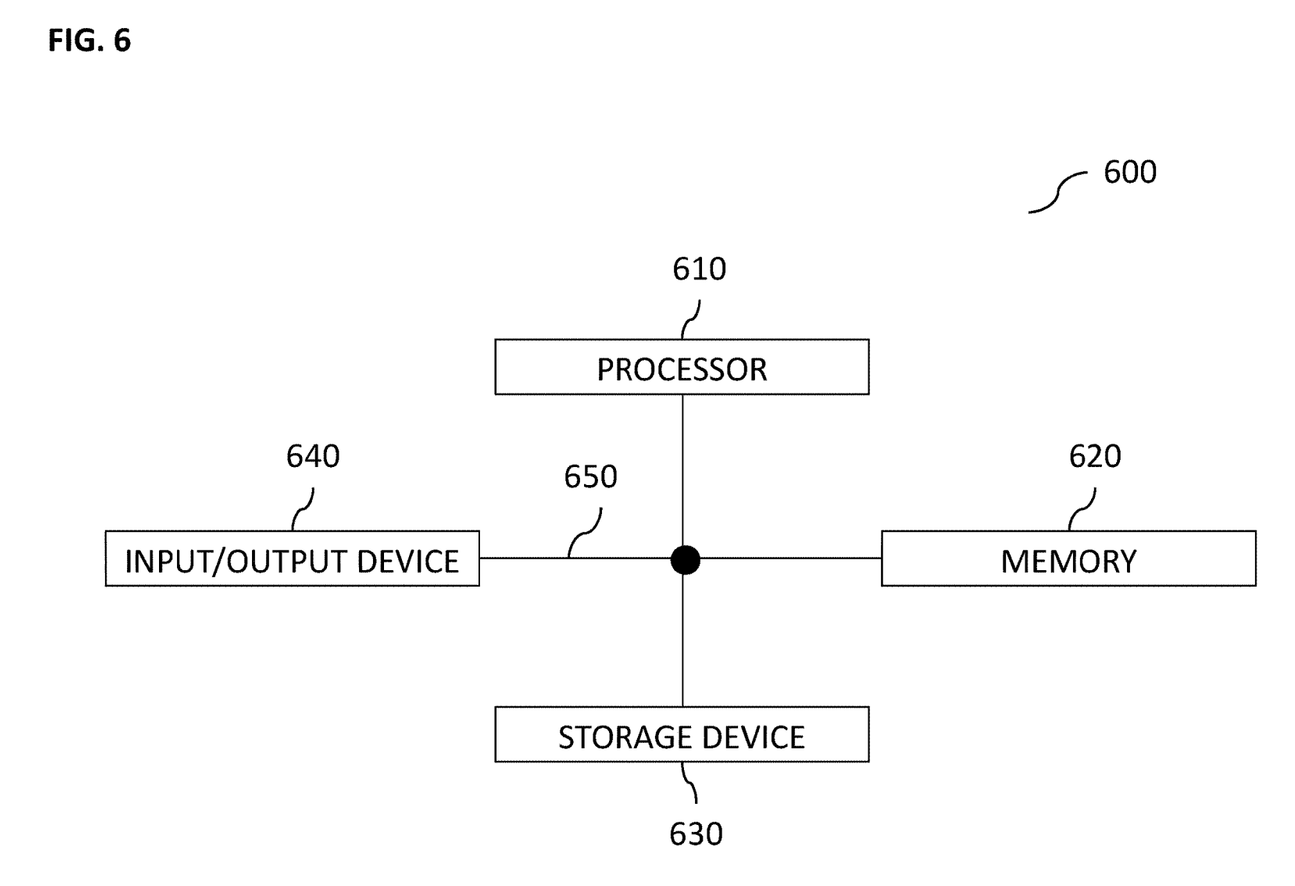
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
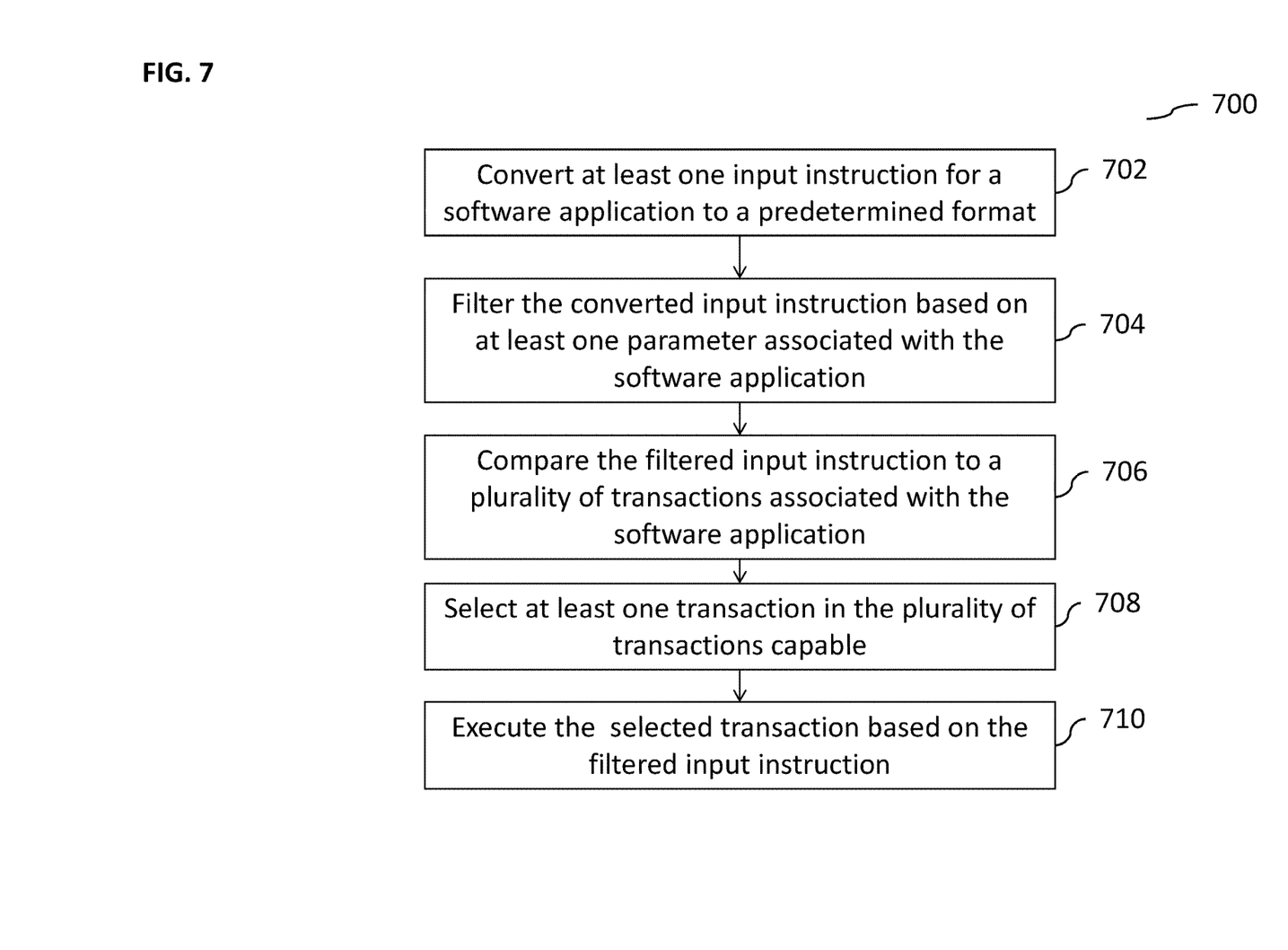
FIG. 7 is an exemplary method, according to some implementations of the current subject matter.

FIG. 7 illustrates an exemplary method 700 for using contextual natural language in software applications, according to some implementations of the current subject matter. At 702, at least one input instruction (e.g., audio, video, text, graphic, etc.) can be converted using a natural language processing. The conversion can perform using a predetermined format of a software application for which instruction may be intended. At 704, using the natural language processing, the converted input instruction can be filtered based on at least one parameter associated with the software application (e.g., "quarter", "year", etc. for a financial report). At 706, the filtered input instruction can be compared to a plurality of transactions associated with the software application to determine if there is a match between the instruction and the data and/or functions of the software application. At 708, at least one transaction in the plurality of transactions can be selected based on the comparison. The transaction can be executed by the software application in response to the filtered input instruction. This can include obtaining data, executing a function (e.g., generating a view containing a table, executing a trade, saving a particular scenario, etc.). At 710, the software application can execute the selected transaction based on the filtered input instruction.

In some implementations, the current subject matter can include one or more of the following optional features. The input instruction can include at least one of the following: an audio, a video, a text, a graphic, and any combination thereof. The parameter(s) can include at least one of the following: at least one static parameter and at least one dynamic parameter. The converted input instruction can be filtered using the static parameter to determine at least one token. The token can identify at least one portion of the converted input instruction and can be used to select the transaction from the plurality of transactions. The dynamic parameter can identify at least one additional transaction in the plurality of transactions associated with selected transaction (e.g., looking into additional data, triggers, etc.).

In some implementations, the execution of the transaction can include generating at least one view on at least one user interface to present an output of the executed selected transaction. The output can include at least one of the following: an audio, a video, a text, a graphic, and any combination thereof.

In some implementations, the method can also include providing, based on the executed selected transaction, at least another input instruction, and selecting, based on another input instruction, at least another transaction in the plurality of transactions and executing that transaction.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   executing, by a natural language processor, a pre-processing parameter setup of a software application configured to receive at least one input instruction from a user, the pre-processing including:
      setting at least one static application parameter corresponding to at least one static action defined by the software application and executed by the natural language processor in response to at least one input instruction by the user; and
      setting at least one dynamic application parameter corresponding to at least one dynamic action executed by the natural language processor retrieved from at least one stored data model upon the software application generating a predetermined graphical user interface view for the user that is dependent upon the at least one input instruction received from the user;
   receiving, by the natural language processor, the at least one input instruction from the user, the at least one input instruction having a context;
   converting, by the natural language processor, the at least one input instruction for the software application to a predetermined format associated with the software application;
   assigning, by the natural language processor, one or more tokens to one or more portions of the at least one converted input instruction, each token of the one or more tokens corresponding to at least one of the at least one static application parameter and the at least one dynamic application parameter;
   classifying, by the natural language processor, each of the tokens of the converted input instruction based on the context of the at least one input instruction to generate a tokenized context of the converted input instruction;
   comparing, by the natural language processor, the tokenized context of the converted input instruction to at least one transaction of a plurality of transactions associated with, and executed by the software application;
   selecting, based on the comparing, the at least one transaction configured to be executed by the software application in response to matching of the tokenized context of the converted input instruction and the at least one transaction; and
   executing, by the software application, the at least one selected transaction.

2. The method according to claim 1, wherein the at least one input instruction includes at least one of the following: an audio, a video, a text, a graphic, and any combination thereof.

3. The method according to claim 1, wherein the at least one token identifies at least a portion of the at least one converted input instruction, the selecting based on determining that the portion is associated with the at least one transaction; and
   wherein the dynamic parameter identifies at least one additional transaction in the plurality of transactions associated with the at least one selected transaction.

4. The method according to claim 1, wherein the executing further comprises generating at least one view on at least one user interface to present an output of the at least one executed selected transaction.

5. The method according to claim 4, wherein the output includes at least one of the following: an audio, a video, a text, a graphic, and any combination thereof.

6. The method according to claim 1, further comprising:
   providing, via a user interface and based on the executing the at least one selected transaction, at least another input instruction; and
   selecting, based on receiving the another input instruction, at least another transaction in the plurality of transactions and executing the at least another transaction.

7. A system comprising:
   at least one programmable processor; and
   a machine-readable medium storing instructions that, when executed by the at least one programmable processor, cause the at least one programmable processor to perform operations comprising:
      executing, by a natural language processor, a pre-processing parameter setup of a software application configured to receive at least one input instruction from a user, the pre-processing including:
         setting at least one static application parameter corresponding to at least one static action defined by the software application and executed by the natural language processor in response to at least one input instruction by the user; and setting at least one dynamic application parameter corresponding to at least one dynamic action executed by the natural language processor retrieved from at least one stored data model upon the software application generating a predetermined graphical user interface view for the user that is dependent upon the at least one input instruction received from the user;

receiving, by the natural language processor, the at least one input instruction from the user, the at least one input instruction having a context;

converting, by the natural language processor, the at least one input instruction for the software application to a predetermined format associated with the software application;

assigning, by the natural language processor, one or more tokens to one or more portions of the at least one converted input instruction, each token of the one or more tokens corresponding to at least one of the at least one static application parameter and the at least one dynamic application parameter;

classifying, by the natural language processor, each of the tokens of the converted input instruction based on the context of the at least one input instruction to generate a tokenized context of the converted input instruction;

comparing, by the natural language processor, the tokenized context of the converted input instruction to at least one transaction of a plurality of transactions associated with, and executed by the software application;

selecting, based on the comparing, the at least one transaction configured to be executed by the software application in response to matching of the tokenized context of the converted input instruction and the at least one transaction; and executing, by the software application, the at least one selected transaction.

8. The system according to claim 7, wherein the at least one input instruction includes at least one of the following: an audio, a video, a text, a graphic, and any combination thereof.

9. The system according to claim 7, wherein the at least one token identifies at least a portion of the at least one converted input instruction, the selecting based on determining that the portion is associated with the at least one transaction; and
wherein the dynamic parameter identifies at least one additional transaction in the plurality of transactions associated with the at least one selected transaction.

10. The system according to claim 7, wherein the executing further comprises generating at least one view on at least one user interface to present an output of the at least one executed selected transaction.

11. The system according to claim 10, wherein the output includes at least one of the following: an audio, a video, a text, a graphic, and any combination thereof.

12. The system according to claim 7, wherein the operations further comprise:
providing, via a user interface and based on the executing the at least one selected transaction, at least another input instruction; and
selecting, based on receiving the another input instruction, at least another transaction in the plurality of transactions and executing the at least another transaction.

13. A computer program product comprising a non-transitory machine-readable medium storing instructions that, when executed by at least one programmable processor, cause the at least one programmable processor to perform operations comprising:
executing, by a natural language processor, a pre-processing parameter setup of a software application configured to receive at least one input instruction from a user, the pre-processing including:
setting at least one static application parameter corresponding to at least one static action defined by the software application and executed by the natural language processor in response to at least one input instruction by the user; and
setting at least one dynamic application parameter corresponding to at least one dynamic action executed by the natural language processor retrieved from at least one stored data model upon the software application generating a predetermined graphical user interface view for the user that is dependent upon the at least one input instruction received from the user;

receiving, by the natural language processor, the at least one input instruction from the user, the at least one input instruction having a context;

converting, by the natural language processor, the at least one input instruction for the software application to a predetermined format associated with the software application;

assigning, by the natural language processor, one or more tokens to one or more portions of the at least one converted input instruction, each token of the one or more tokens corresponding to at least one of the at least one static application parameter and the at least one dynamic application parameter;

classifying, by the natural language processor, each of the tokens of the converted input instruction based on the context of the at least one input instruction to generate a tokenized context of the converted input instruction;

comparing, by the natural language processor, the tokenized context of the converted input instruction to at least one transaction of a plurality of transactions associated with, and executed by the software application;

selecting, based on the comparing, the at least one transaction configured to be executed by the software application in response to matching of the tokenized context of the converted input instruction and the at least one transaction; and executing, by the software application, the at least one selected transaction.

14. The computer program product according to claim 13, wherein the at least one input instruction includes at least one of the following: an audio, a video, a text, a graphic, and any combination thereof.

15. The computer program product according to claim 13, wherein the at least one token identifies at least a portion of the at least one converted input instruction, the selecting based on determining that the portion is associated with the at least one transaction; and
wherein the dynamic parameter identifies at least one additional transaction in the plurality of transactions associated with the at least one selected transaction.

16. The computer program product according to claim 13, wherein the executing further comprises generating at least one view on at least one user interface to present an output of the at least one executed selected transaction.

17. The computer program product according to claim 16, wherein the output includes at least one of the following: an audio, a video, a text, a graphic, and any combination thereof.

18. The computer program product according to claim 13, wherein the operations further comprise:
   providing, via a user interface and based on the executing the at least one selected transaction, at least another input instruction; and
   selecting, based on receiving the another input instruction, at least another transaction in the plurality of transactions and executing the at least another transaction.

\* \* \* \* \*